(12) United States Patent
Chaudhari et al.

(10) Patent No.: US 7,160,621 B2
(45) Date of Patent: Jan. 9, 2007

(54) ENERGY ABSORBING ARTICLES

(75) Inventors: Tansen Dhananjay Chaudhari, Bangalore (IN); Chinniah Thiagarajan, Bangalore (IN); Poovanna Kushalappa Theethira, Bangalore (IN); Stephen Shuler, Royal Oak, MI (US); Eric Jon Jaarda, Milan, MI (US)

(73) Assignee: General Electric Company, Niskayuna, NY (US)

( * ) Notice: Subject to any disclaimer, the term of this patent is extended or adjusted under 35 U.S.C. 154(b) by 0 days.

(21) Appl. No.: 10/881,948

(22) Filed: Jun. 28, 2004

(65) Prior Publication Data
US 2005/0287371 A1 Dec. 29, 2005

(51) Int. Cl.
*B32B 27/36* (2006.01)
(52) U.S. Cl. .................. 428/412; 293/120; 293/122
(58) Field of Classification Search ............ 293/120, 293/122; 428/412
See application file for complete search history.

(56) References Cited

U.S. PATENT DOCUMENTS 6,117,518 A * 9/2000 Cawse et al. ............... 428/116
2004/0056463 A1 * 3/2004 Marks et al. ............... 280/752
2004/0094975 A1 * 5/2004 Shuler et al. ............... 293/120

OTHER PUBLICATIONS

"Foam Structures With Negative Poisson's Ratio" By Roderic Lakes, University of Wisconsin adapted from Science, 235, 1038-1040.*
Auxetic Materials: the positive side of being negative, by K. E. Evans and K. L. Alderson.*
Kenneth E. Evans et al., "*Auxetic Materials: Functional Materials and Structures From lateral Thinking!*", Advanced materials, vol. 12, No. 9, pp. 617-628, 2000.
Roderic Lakes, "*Foam Structures With a Negative Poisson's Ratio*", Science, vol. 235, pp. 1038-1040, 1987.

* cited by examiner

*Primary Examiner*—Terressa Boykin
(74) *Attorney, Agent, or Firm*—Fletcher Yoder

(57) ABSTRACT

An article comprises a plurality of auxetic structures wherein the auxetic structures are of size greater than about 1 mm. The article also comprises at least one cell boundary that is structurally coupled to the auxetic structures. The cell boundary is configured to resist a deformation of the auxetic structures. An automotive energy absorber comprises a plurality of auxetic structures wherein the auxetic structures are of size greater than about 1 mm.

33 Claims, 3 Drawing Sheets

ENERGY ABSORBING ARTICLES

BACKGROUND OF THE INVENTION

The present invention relates in general to energy absorbing systems, and more specifically to energy absorbing systems and articles having auxetic structures.

Energy absorbing systems broadly find application in many situations where excess energy needs to be managed, without causing damage to surrounding objects. For example, in the automotive industry, such systems are also referred to as Energy Absorbers (EA) and find an application in bumper systems of cars and the like. Typically, bumpers are designed to absorb most of the impact in case of collisions with other objects, including vehicles, stationary objects or pedestrians, to minimize damage to the passengers and the pedestrians. Conventionally energy absorbers have been manufactured using expanded foam or thermoplastic materials attached to a metal beam. The energy absorbers used in bumpers are required to provide safety-enhancing levels of energy absorption for collisions at impact speeds of about 40 km/hour and to minimize potential damage to pedestrians in low speed collisions between vehicles and pedestrians. Further, compliance with industry regulations, for example the need to provide adequate deformation in low speed collisions to minimize potential damage to pedestrians, and to provide a high barrier force in case of high speed impact, presents significant challenges to conventional metal or plastic bumpers. Further, modern energy absorbing systems must cope with complex situations such as multiple impact collisions wherein a second impact occurs on a previously deformed bumper. Typical energy absorbers (EA) occupy large volumes, which in some cases, is undesirable due to vehicle styling trends such as "low-offset bumpers".

To meet today's rigorous safety standards while satisfying the requirements of current vehicle styling trends there exists a need for energy absorbing systems which are lightweight and low volume, and which provide better resistance to deformation and higher collision impact energy absorption than currently available energy absorbing systems. In general, there exists a need for energy absorbing systems capable of absorbing more energy at a lower mass, both within automotive applications and non-automotive applications.

BRIEF DESCRIPTION OF THE INVENTION

The present invention relates to articles comprising a plurality of auxetic structures wherein the auxetic structures are of size greater than about 1 mm. The articles of the present invention also comprise at least one cell boundary structurally coupled to the auxetic structures. The cell boundary is configured to resist a deformation of the auxetic structures.

In another aspect the present invention relates to an article comprising auxetic structures structurally coupled to at least one cell boundary, which is a vehicle part.

In another aspect the present invention relates to an article comprising auxetic structures structurally coupled to at least one cell boundary, which is an article of personal protective equipment.

In another aspect the present invention relates to an article comprising auxetic structures structurally coupled to at least one cell boundary, which is a construction material for buildings.

In another aspect the present invention relates to an article comprising auxetic structures, which is an automotive energy absorber.

In another aspect the present invention relates to a method of manufacturing an article comprising a plurality of auxetic structures wherein the auxetic structures are of size greater than about 1 mm, the article also comprising at least one cell boundary structurally coupled to the auxetic structures.

DETAILED DESCRIPTION OF THE INVENTION

The present invention may be understood more readily by reference to the following detailed description of preferred embodiments of the invention and the examples included therein. In the following specification and the claims which follow, reference will be made to a number of terms which shall be defined to have the following meanings:

The singular forms "a", "an" and "the" include plural referents unless the context clearly dictates otherwise.

Figure 1:
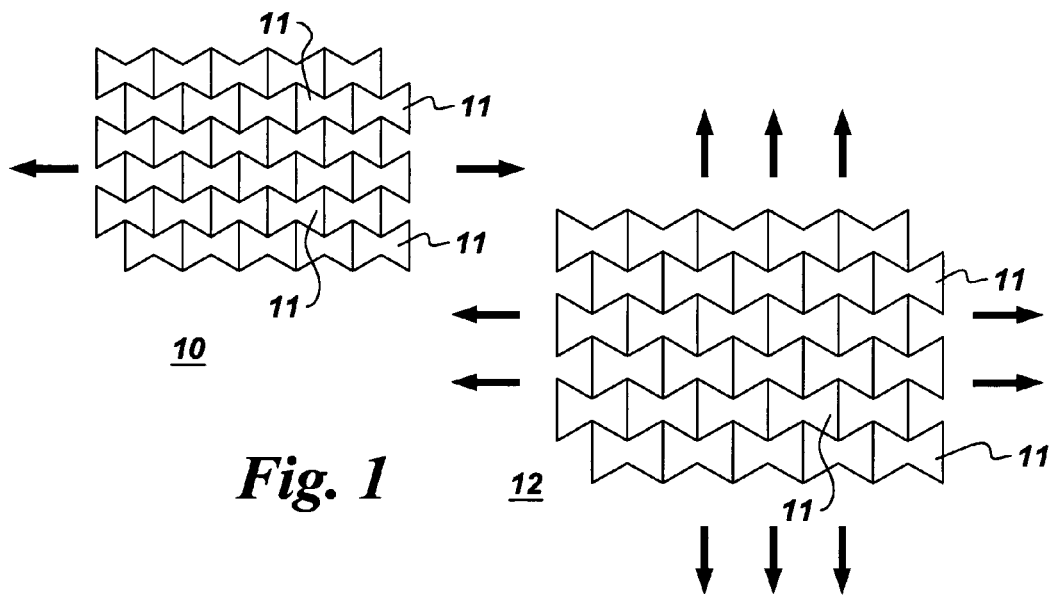
FIG. 1 is a schematic of an auxetic structure, illustrating a lateral expansion strain.
Figure 2:
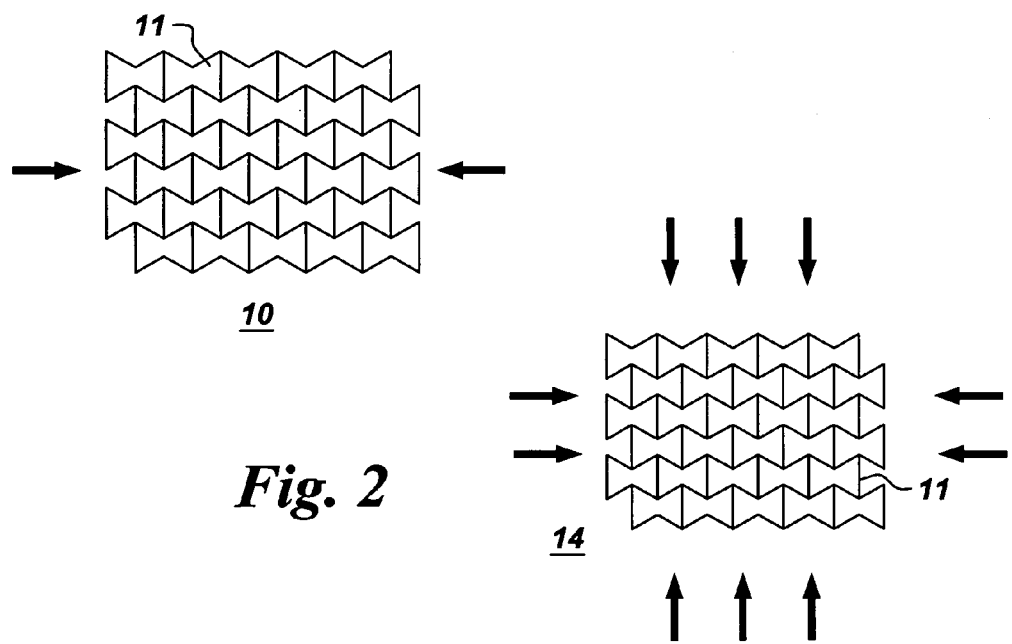
FIG. 2 is a schematic of an auxetic structure, illustrating a lateral compression strain.

As noted, the present invention provides an article comprising auxetic structures. Auxetic structures enable an article to exhibit an expansion in a longitudinal direction, on subjecting the article to a lateral stress or strain. Conversely, auxetic structures also exhibit a contraction in the longitudinal direction on subjecting the article to lateral compression. Auxetic structures are illustrated by FIG. 1 which shows an undeformed auxetic structure comprising a plurality of substructures 11. The substructures 11, also referred to herein as "auxetic structure-forming cells", constitute the auxetic structure 10. An undeformed auxetic structure 10, as illustrated in FIG. 1, deforms under a lateral expansion stress (indicated by solid arrows), following a rib-hinge mechanism to a longitudinally expanded configuration 12. Similarly, FIG. 2 illustrates the undeformed auxetic structure 10 undergoing a lateral compression strain, deforming to a longitudinally compressed configuration 14. For articles having auxetic structures undergoing tension in the longitudinal direction, the ratio of the lateral strain to the longitudinal strain is negative. This ratio is a measure of how much thinner an article becomes when it is stretched.

Figure 3:
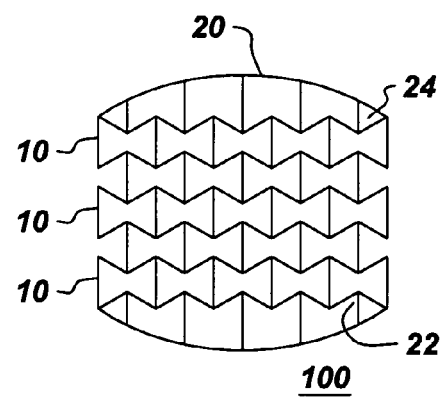
FIG. 3 is a schematic of an auxiarch structure cross-section according to an embodiment of the present invention.

It has been discovered that the combination of an auxetic structure and a cell boundary provides a means of conferring enhanced energy absorbance upon an article comprising both the auxetic structure and the cell boundary. In one aspect, the cell boundary refers to a boundary configured to resist the deformation of the auxetic structures. FIG. 3 shows an article 100 comprising a cell boundary 20 structurally coupled to an auxetic structure 10, according to an embodiment. The cell boundary 20 has a curvature that enhances the resistance to the deformation of the auxetic structure as shown in the embodiment illustrated in FIG. 3. It is appreciated that the cell boundary curvature may be convex, concave, angular or possess a combination of such features. In the embodiment illustrated in FIG. 3, the cell boundary has a uniform thickness. In alternate embodiments, the cell boundary may possess a varying thickness. The cell boundary is structurally coupled to the auxetic structures. In the embodiment illustrated in FIG. 3 the cell boundary is structurally coupled using "connectors" 22 and 24. Connectors are physical extensions of the cell boundary 20 into the auxetic structure 10. The curvature of the cell boundary may be configured to resist a strain in the auxetic structure in at least one direction, within a given packaging space. For example, in the embodiment illustrated in FIG. 3, the cell boundary 20 has an outward convex shape. The cell boundary is configured to resist a lateral compression of the article as follows. A lateral compressive strain induces a longitudinal compression in the auxetic structure 10, in a way similar to that illustrated by FIG. 2. Connectors 22 and 24 therefore tend to move vertically inward, which motion is resisted by the cell boundary 20.

The structure illustrated in FIG. 3 may also be referred to as an "auxiarch" structure, and wherever used in the present discussion, the term "auxiarch" will be understood to refer to a structure comprising a cell boundary structurally coupled to an auxetic structure via connectors. The auxetic structures, as discussed, are contemplated to have at least one dimension (length, breadth or width) of about 1 mm. In some embodiments it is preferred that at least one dimension of the auxetic structure be at least about 10 mm. In yet another embodiment it is preferred that at least one dimension of the auxetic structure be at least about 100 mm. In one embodiment the auxetic structures are uniform (uniform distribution) in size. In an alternate embodiment the auxetic structures differ (non-uniform distribution) in size. It will be appreciated, that the auxetic structure 10 illustrated in FIG. 3 has a "rib-hinge" structure, however, other auxetic structures may be used without deviating from the scope and spirit of the invention.

In one embodiment, the article 100 (FIG. 3) of the present invention comprises at least one plastic material. The plastic material may be a thermoplastic or a thermoset material. In some instances the article may comprise a combination of one or more thermoplastic materials and one or more thermoset materials. Plastic materials suitable for use according to the present invention include but are not limited to polycarbonate-ABS blends (PC-ABS blends), polycarbonate-poly(butylene terephthalate) blends (PC-PBT blends), polyphenylene ethers, blends comprising polyphenylene ethers, high density polyethylene, polyalkylenes (for example polypropylenes, and polyethylenes), polycarbonates, polyamides, olefin polymers, polyesters, polyestercarbonates, polysulfones, polyethers, polyetherimides, polyimides, silicone polymers, mixtures of the foregoing polymers, copolymers of the foregoing polymers, and mixtures thereof. Certain embodiments utilize bisphenol-A polycarbonate as the plastic material. In one embodiment the plastic material is XENOY, a polymer blend comprising polycarbonate and poly(butylene terephthalate) available from GE Plastics.

In other embodiments, the article 100 may comprise at least one metal. In certain embodiments aluminum is used. Other examples of metals suitable for use in the article according to the invention include aluminum, nickel, magnesium, copper, iron, molybdenum, tungsten, steel, and alloys comprising aluminum, nickel, magnesium, copper, iron, molybdenum, and tungsten.

In another embodiment, the article 100 (FIG. 3) comprises at least one plastic material and at least one metal. In certain cases, the choice of the material the article comprises is based on a desired strength to weight ratio. Typically, a higher percentage of metal increases the weight of the article and may also increase the strength. Various combinations of metal and plastic materials, depending upon the application of the auxiarch-comprising article, will be apparent to those skilled in the art. In one embodiment, the cell boundary 20 of the article 100 comprises a plastic material and the auxetic structure 10 comprises a metal. In another embodiment, the cell boundary 20 of the article 100 comprises a metal and the auxetic structure 10 comprises a plastic material.

In a yet another embodiment, the article comprises at least one composite material. The composite material may comprise thermoset or thermoplastic materials. Other materials which may be used in the composite material include polymers, glass fibers, carbon fibers, aramid fibers, carbon nanotubes, metal powders, metals, intermetallics, organoclays, inorganic clays, ceramics, or any combination of the above. The fibers, as discussed, include short fibers which can be injection molded. Composite material types include, continuous fiber composites, chopped strand mat composites, woven fabric composites, three-dimensional fabric based composites and the like. "Composite materials" as used herein, also includes materials that are meso- or nano-level mixtures of organic compounds, for example, polymers and inorganic compounds, and mixtures of polymers and ceramic materials.

Figure 4:
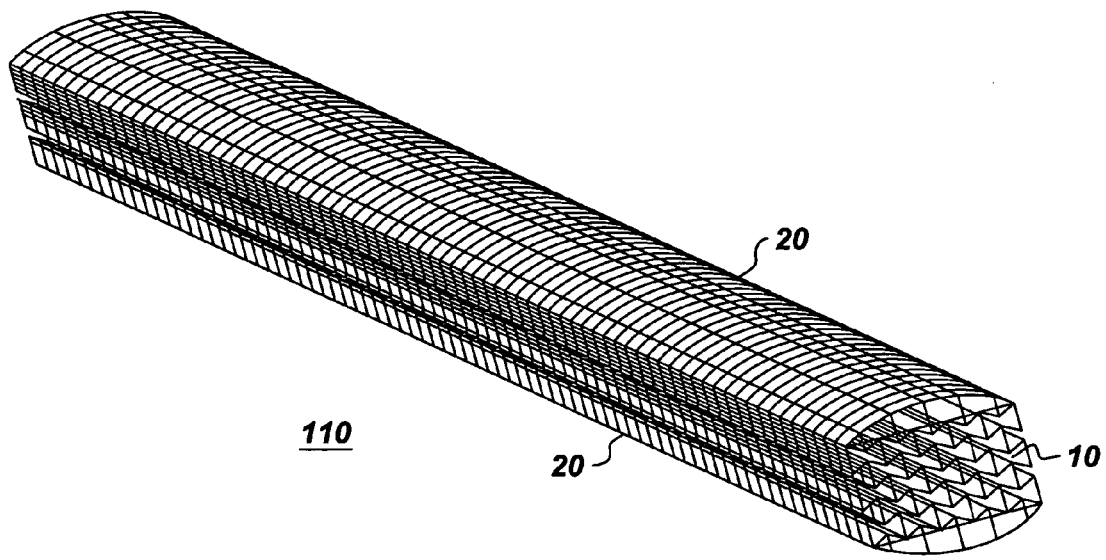
FIG. 4 is a perspective view of an article having an auxiarch structure.

As noted above, the article 100 having the auxiarch structure possesses enhanced deformation resisting characteristics. The auxiarch-comprising article finds uses in various environments. In one embodiment, the auxiarch-comprising article is configured as a vehicle part. Vehicles, in general, include transportation systems such as boats, aircraft, aircraft interiors, trains, buses, cars, two-wheelers, tractors, trucks, trailers, personal watercraft, jet skis, and snowmobiles among others. FIG. 4 illustrates the auxiarch-comprising article configured as an energy absorber (EA) 110 of an automotive bumper. The energy absorber shown in the embodiment illustrated by FIG. 4, comprises auxetic structures wherein each auxetic structure is made up of between 3 and 10 auxetic structure-forming cells. However, auxetic structures comprising a greater number of auxetic structure-forming cells 11 (FIG. 1) are also possible. Further, FIG. 4 illustrates the energy absorber having cell boundaries 20 structurally coupled to the auxetic structures on the top and bottom of the auxetic structures. In an alternate embodiment, cell boundaries may be structurally coupled to the left and right sides of an auxetic structure having an alignment different from the auxetic structure shown in FIG. 4. Various advantageous embodiments are included in the spirit of the invention. Other examples of vehicle parts that may be configured from auxiarch-comprising articles include knee bolsters, head rests, instrument panels, seats, cushions, among others.

In one embodiment, the auxiarch-comprising articles are personal protective equipment articles. Personal protective equipment includes headgear such as safety helmets, boots, jackets, gloves, eyeglasses, and the like.

In another embodiment, the auxiarch-comprising articles may be used in large structures, for example, as construction materials for buildings. Auxiarch-comprising articles as construction materials may advantageously be applied in earthquake proofing of various buildings, foundations, walls, girders, supports, wall sections, beams, roof joists, floor joists, room dividers, and other building structures. For example, certain zones of a building are sensitive to any strain caused by external forces, such as an earthquake or cyclones. Typically, under stresses generated by earthquakes or cyclones and like disasters, strains are generated in various zones of a building. The typical construction materials are non-auxetic, and accordingly the typical strains induced in building structures have a non-auxetic behavior. The non-auxetic construction material used in the building structure, on elongation in the longitudinal direction, contracts in the lateral direction. This induced strain or the deformation in the building structures further weakens the building structure, and may lead to additional stress and strain in various building structures. This can result in a failure of the overall building structure by a domino effect. Accordingly, auxiarch-comprising articles may be included in such zones. These articles advantageously compensate for the non-auxetic deformation, thereby improving the resistance of the buildings to structural failure.

The auxiarch structures and auxiarch-comprising articles may be manufactured in various ways. According to one embodiment of the present invention the auxiarch-comprising articles are manufactured by injection molding a plastic material. In general, injection molding comprises heating a plastic feedstock while avoiding thermal damage to the plastic material, and filling a suitable mold by injecting the plastic material into the mold at suitable pressures, location(s) and feed rate. The suitable mold has one or more cavities corresponding to the desired auxiarch structure. Next, the pressure is maintained for a specified time to assure the mold is packed, and the pressure is removed when the plastic material solidifies. The molded article is then ejected from the mold and, optionally, cured thereafter. Any specific injection molding technique may be applied for manufacturing articles having auxiarch structures, without deviating from the scope and spirit of the present invention.

Figure 5:
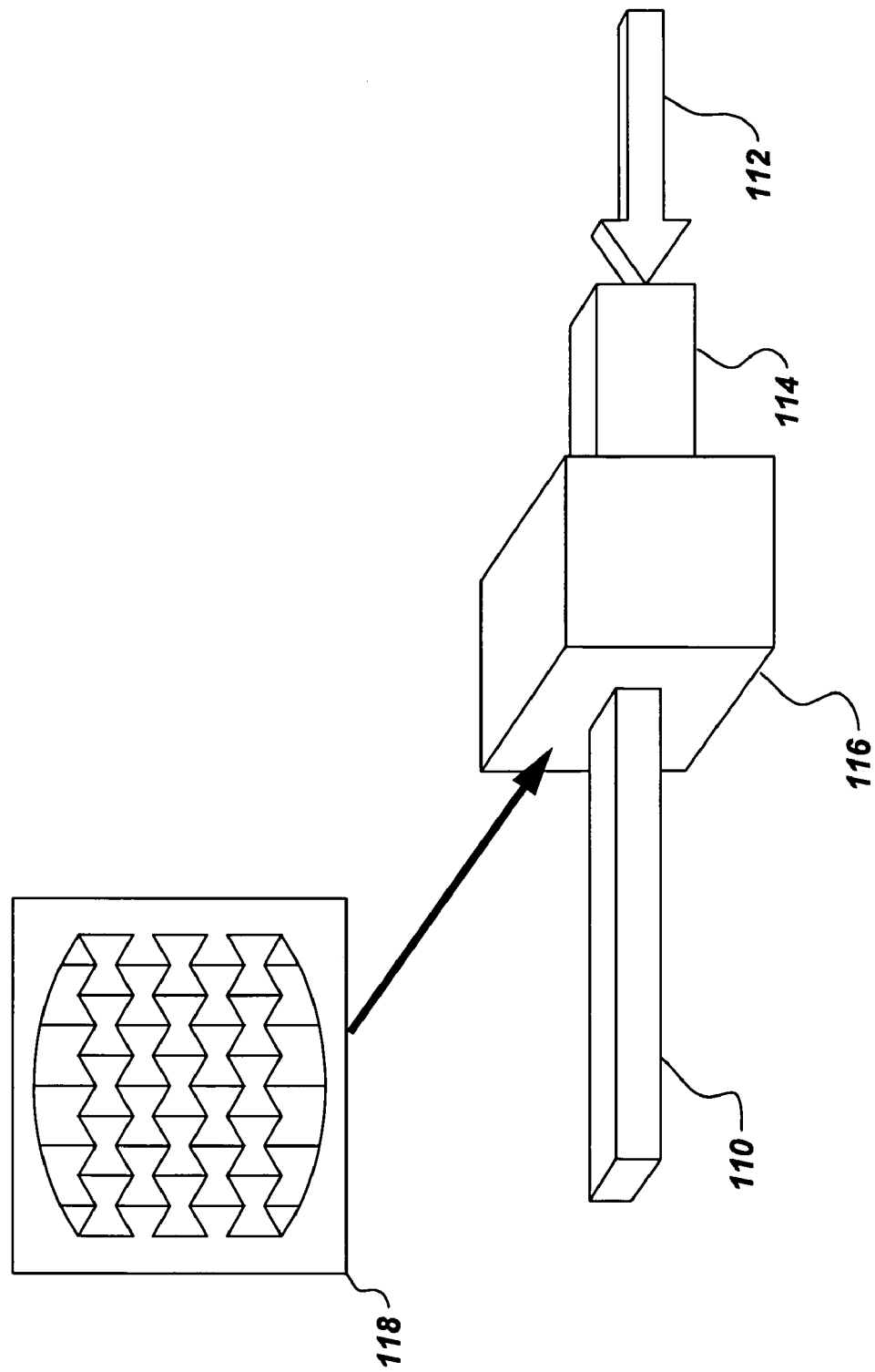
FIG. 5 is a schematic illustrating manufacture of an article comprising an auxiarch structure.

According to another method of manufacturing articles having auxiarch structures, extrusion methods may be used as illustrated in FIG. 5. In general, a screw 112 pushes a plastic material 114 at suitable temperature through a die 116, by forcing the plastic material from the appropriate side of the die. The plastic material passes through the die 116 comprising a cross section 118 that is complimentary to the desired auxiarch structure, thereby forming an article 110 comprising the auxiarch structures. Any extrusion technique, including pulltrusion, may be applied for manufacturing articles having auxiarch structures. Other suitable techniques for manufacturing the auxiarch-comprising articles include resin transfer molding, and vacuum assisted resin transfer molding, among other known techniques.

According to one embodiment, an automotive energy absorber comprises a plurality of auxetic structures wherein the auxetic structures are of a size greater than about 1 mm and the energy absorber comprises from about 3 to about 10 auxetic structure-forming cells across the width of the energy absorber. It has been discovered that energy absorbers comprising auxetic structures advantageously provide energy absorbance at high impact speeds and, at the same time, provide lateral contraction under typical "pedestrian impact conditions". A lateral contraction was found to diminish impact damage to the "pedestrian" in model vehicle-pedestrian collisions. This discovery enables an energy absorber consisting of single member to comply with industry safety regulations in various collision modes, including pedestrian collisions, front end pendulum collisions and the like. The energy absorber, according to this embodiment, comprises plastic materials, as discussed above with reference to auxiarch-comprising articles. In one aspect, the energy absorber comprises the material XENOY (GE Plastics). According to another embodiment, an automotive bumper comprises an energy absorber comprising auxetic structures, as discussed above.

In one embodiment, the present invention provides a method for making an energy absorber comprising auxetic structures, the method comprising extruding a plastic material through a die having a cross section complimentary in structure to the auxetic structures generated in the extruded plastic following passage through the die.

Articles having auxiarch structures, as disclosed herein, demonstrate enhanced resistance to deformation, exhibit auxetic behavior by expanding in a longitudinal direction on being subjected to a lateral expansion, and may be manufactured using relatively simple manufacturing processes such as extrusion, among other advantages. For example, the enhanced resistance to deformation of auxiarch structures is useful in automotive bumper applications. An energy absorber comprising an auxiarch structure is also particularly advantageous because as the energy absorber width decreases (typical bumper behavior in the case of a front-end collision of a vehicle) a barrier force offered by the energy absorber increases. Further, an improved impact resistance, due to the rib hinge action (in auxiarch materials comprising rib hinge auxetic structures) makes possible a single member energy absorber providing for compliance with industry safety regulations in various collision modes, including pedestrian collisions, front end pendulum collisions and the like. The increased strength offered by materials comprising auxiarch structures allows the reduction of the total mass of the energy absorber thereby reducing the overall weight of the vehicle and reducing, in certain instances, the packaging space of the energy absorber. Although, the energy absorber is showcased here, the advantages of articles comprising auxiarch structures are applicable in a wide variety of applications as noted above.

Numerical Evaluation Section

A comparison of performance parameters of a conventional energy absorber (Comparative Example, CEx), an energy absorber comprising auxetic structures (Example 1), and an energy absorber comprising auxiarch structures (Example 2) indicates the advantages brought forth by various embodiments discussed above. The following data was generated by simulating various energy absorbers by forming a test mesh using Hypermesh™ software, and testing it for impact behavior using LsDyna™ software. The term "example" as used herein will be understood to refer to the outcome of a numerical simulation, and not an actual physical test. The comparative example represents the simulated behavior of a conventional energy absorber. A packaging space of about 100 mm of the energy absorber of the comparative example was analyzed under standard conditions. Example 1 represents an energy absorber comprising a "straight" auxetic structure. Example 2 represents an energy absorber comprising a straight auxiarch-structure. In Examples 1 and 2 the numerical simulations were conducted using a simulated wall thickness of 3 millimeters (mm), and a packaging space of about 60 mm. It will be appreciated by those skilled in the art that Examples 1 and 2 are simulations of a type widely used by automotive design engineers. Such simulations are known by those skilled in the art to be useful in predicting the performance of actual curved energy absorbers.

TABLE 1

|  | Comparative Example (CEx) | Example 1 (Ex 1) | Example 2 (Ex 2) |
|---|---|---|---|
| Force (KN) | 130 | 200 | 700 |
| Intrusion (mm) | 50 | 15 | 6 |
| % Efficiency | 85 | 81 | 67 |
| Mass (kg) | 1.8 | 2.1 | 2.8 |

As can be seen from Table 1, the low Force value (Force (KN)=130) of the comparative example (CEx) as compared to Examples 1 and 2 indicates a lower barrier force offered by the conventional energy absorber of the comparative example relative to Examples 1 and 2 which represent energy absorbers possessing auxetic structures and auxiarch structures respectively. A high intrusion distance in CEx implies that the energy absorber in this case yields to a higher extent as compared to Examples 1 and 2 upon impact. Mass is an important performance parameter, and in general, a lower value of mass is desirable. It is noted here that although energy absorbers of Examples 1 and 2 have a greater mass, lower mass energy absorbers may be obtained by decreasing the wall thickness of the energy absorbers in Examples 1 and 2 from 3 mm to 1.5 mm. This reduces the mass of each energy absorber to approximately half the value as illustrated in Table 1. The energy absorbers corresponding to Examples 1 and 2, with the reduced masses of about 1 kg and 1.4 kg, respectively, are estimated using techniques similar to those employed in Examples 1 and 2 to have Force values of about 150 KN (auxetic structure alone) and 300 KN (auxiarch structure). In Table 1 the % efficiency is a ratio of the energy absorbed to the kinetic energy applied to the energy absorber, and in general, a higher value of % efficiency is desirable. The higher % efficiency observed for the comparative example indicates better performance than either of Examples 1 or 2. Here again, an improvement in the % Efficiency may be achieved by reduction of the wall thickness which makes the % Efficiency performance of Examples 1 and 2 substantially comparable to that of the comparative example. Advantageously, this improved % Efficiency will be achieved in a smaller packaging space. The configurations illustrated in Examples 1 and 2, as projected and compared with the comparative example, represent a substantial improvement over the existing art.

The invention has been described in detail with particular reference to preferred embodiments thereof, but it will be understood by those skilled in the art, that variations and modifications can be effected within the spirit and scope of the invention.

What is claimed is:

1. An article comprising:
   a plurality of auxetic structures, said auxetic structures having a size greater than about 1 mm; and
   at least one cell boundary structurally coupled to the auxetic structures, said at least one cell boundary configured to resist a deformation of said auxetic structures, said at least one cell boundary at least partially surrounding the plurality of auxetic structures collectively and including a plurality of connectors extending into the auxetic structures to structurally couple the at least one cell boundary to the auxetic structures.

2. The article of claim 1, further comprising at least one plastic material.

3. The article of claim 2, wherein said plastic material is selected from the group consisting of thermoplastics and thermosets.

4. The article of claim 2, wherein said plastic material is selected from the group consisting of polycarbonate ABS blends, polycarbonate-poly(butylene terephthalate)blends, polyphenylene ethers, blends comprising polyphenylene ethers, high density polyethylene, polyalkylenes, polypropylenes, polyethylenes, polycarbonates, polyamides, olefin polymers, polyesters, polyestercarbonates, polysulfones, polyethers, polyetherimides, polyimides, silicone polymers, mixtures of the foregoing polymers, copolymers of the foregoing polymers, and mixtures thereof.

5. The article of claim 4, wherein said plastic material is a polycarbonate.

6. The article of claim 5, wherein said plastic material is bisphenol-A-polycarbonate.

7. The article of claim 1, further comprising at least one metal.

8. The article of claim 7, wherein said metal is selected from the group consisting of aluminum, nickel, magnesium, copper, iron, molybdenum, tungsten, steel and mixtures thereof.

9. The article of claim 7, wherein said metal is aluminum.

10. The article of claim 2, further comprising at least one metal.

11. The article of claim 10, wherein said auxetic structure comprises at least one plastic material and said cell boundary comprises at least one metal.

12. The article of claim 10, wherein said auxetic structure comprises at least one metal and said cell boundary comprises at least one plastic material.

13. The article of claim 1, comprising at least one composite material.

14. The article of claim 13, wherein said composite material comprises at least one thermoplastic or thermoset material.

15. The article of claim 14, wherein said composite further comprises at least one material selected from the group consisting of polymers, glass fibers, carbon fibers, aramid fibers, carbon nanotubes, metals, metal powders, intermetallics, organoclays, inorganic clays, and ceramics.

16. The article of claim 1, which is a vehicle part.

17. The article of claim 16, wherein said vehicle part is selected from the group consisting of energy absorbers, bumpers, knee bolsters, head rests, instrument panels, seats and cushions.

18. The article claim 17, wherein said vehicle part is an energy absorber for an automotive bumper.

19. The article of clam 18, wherein said energy absorber comprises at least one material selected from the group consisting of plastic materials, metallic materials and composite materials.

20. The article of claim 19, wherein said energy absorber comprises at least one plastic material selected from the group consisting of polycarbonate-ABS blends, polycarbonate-poly(butylene terephthalate) blends, polyphenylene ethers, blends comprising polyphenylene ethers, high density polyethylene, polyalkylenes, polypropylenes, polyethylenes, polycarbonates, polyamides, olefin polymers, polyesters, polyestercarbonates, polysulfones, polyethers, polyetherimides, polyimides, silicone polymers, mixtures of the foregoing polymers, copolymers of the foregoing polymers, and mixtures thereof.

21. The article of claim 16, wherein said automotive part is a knee bolster disposed within the interior of a vehicle.

22. The article of claim 1, which is an article of personal protective equipment.

23. The article of claim 1, which is a construction material.

24. An energy absorbing plastic article comprising:
a plurality of auxetic structures, said auxetic structures having a size greater than about 1 mm; and
at least one cell boundary structurally coupled to the auxetic structures, said at least one cell boundary configured to resist of a deformation of said auxetic structures, said at least one cell boundary at least partially surrounding the plurality of auxetic structures collectively and including a plurality of connectors extending into the auxetic structures to structurally couple the at least one cell boundary to the auxetic structures.

25. A method of manufacturing an energy absorbing plastic article, wherein the article comprises a plurality of auxetic structures, said auxetic structures having a size greater than about 1 mm, and at least one cell boundary structurally coupled to the auxetic structures, said at least one cell boundary configured to resist a deformation of said auxetic structures, said at least one cell boundary at least partially surrounding the plurality of auxetic structures collectively and including a plurality of connectors extending into the auxetic structures to structurally couple the at least one cell boundary to the auxetic structures, the method comprising:
injection molding a plastic material to form the article, by injecting the plastic material into a mold, the mold comprising cavities corresponding to the auxetic structures and the cell boundary.

26. A method of manufacturing an energy absorbing plastic article, wherein the article comprises a plurality of auxetic structures having dimensions of length, width and depth, at least one of said dimensions being greater than 1 mm, and at least one cell boundary structurally coupled to the auxetic structures, said at least one cell boundary configured to resist a deformation of said auxetic structures, said at least one cell boundary at least partially surrounding the plurality of auxetic structures collectively and including a plurality of connectors extending into the auxetic structures to structurally couple the at least one cell boundary to the auxetic structures, the method comprising:
extruding a plastic material to form the article, wherein said extrusion comprises forcing the plastic material through a die, the die comprising a cross section complimentary to the auxetic structures and the cell boundary.

27. An automotive energy absorber comprising a plurality of auxetic structures, and at least one cell boundary structurally coupled to the auxetic structures, said auxetic structures having a size greater than about 1 mm, said at least one cell boundary configured to resist a deformation of said auxetic structures, said at least one cell boundary at least partially surrounding the plurality of auxetic structures collectively and including a plurality of connectors extending into the auxetic structures to structurally couple the at least one cell boundary to the auxetic structures.

28. The energy absorber of claim 27, further comprising at least one plastic material.

29. The energy absorber of claim 28, wherein said plastic material is selected from the group consisting of thermoplastics and thermosets.

30. The energy absorber of claim 29, wherein said plastic material is selected from the group consisting of polycarbonates, polyamides, olefin polymers, polyesters, polyestercarbonates, polysulfones, polyethers, polyetherimides, polyimides, silicone polymers, mixtures of the foregoing polymers, copolymers, copolymers of the foregoing polymers, and mixtures thereof.

31. The energy absorber of claim 29, wherein said plastic material is a blend comprising polycarbonate and poly (butylene terephthalate).

32. An automotive bumper comprising an energy absorber, said energy absorber comprising a plurality of auxetic structures and at least one cell boundary structurally coupled to the auxetic structures, said auxetic structures having a size greater than about 1 mm, said at least one cell boundary configured to resist a deformation of said auxetic structures, said at least one cell boundary at least partially surrounding the plurality of auxetic structures collectively and including a plurality of connectors extending into the auxetic structures to structurally couple the at least one cell boundary to the auxetic structures.

33. A method of manufacturing an automotive energy absorber comprising a plurality of auxetic structures and at least one cell boundary structurally coupled to the auxetic structures, said auxetic structures having a size greater than 1 mm, said at least one cell boundary configured to resist a deformation of said auxetic structures, said at least one cell boundary at least partially surrounding the plurality of auxetic structures collectively and including a plurality of connectors extending into the auxetic structures to structurally couple the at least one cell boundary to the auxetic structures, the method comprising:
extruding a plastic material to form the automotive energy absorber, wherein said extrusion comprises forcing the plastic material through a die, the die comprising a cross section complimentary to the auxetic structures.

\* \* \* \* \*